(12) United States Patent
Lu et al.

(10) Patent No.: US 10,084,734 B2
(45) Date of Patent: *Sep. 25, 2018

(54) AUTOMATED SPAM FILTER UPDATING BY TRACKING USER NAVIGATION

(71) Applicant: International Business Machines Corporation, Armonk, NY (US)

(72) Inventors: Fang Lu, Billerica, MA (US); Mark McGloin, Dublin (IE); Emmet R. Clifford, Dunstable, MA (US); Stuart J. Clifford, Beverly, MA (US); William M. Quinn, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/834,549

(22) Filed: Aug. 25, 2015

(65) Prior Publication Data
US 2016/0072749 A1    Mar. 10, 2016

Related U.S. Application Data

(63) Continuation of application No. 14/476,874, filed on Sep. 4, 2014, now Pat. No. 9,571,435.

(51) Int. Cl.
*G06F 15/16* (2006.01)
*H04L 12/58* (2006.01)
*H04L 29/06* (2006.01)

(52) U.S. Cl.
CPC ............ *H04L 51/12* (2013.01); *H04L 51/046* (2013.01); *H04L 51/08* (2013.01); *H04L 51/22* (2013.01); *H04L 51/28* (2013.01); *H04L 63/0227* (2013.01); *H04L 63/0236* (2013.01); *H04L 63/1425* (2013.01)

(58) Field of Classification Search
CPC .............................. H04L 51/08; H04L 51/046
USPC ........................................................ 709/206
See application file for complete search history.

(56) References Cited

U.S. PATENT DOCUMENTS

| 7,693,945 B1 | 4/2010 | Dulitz et al. |
| 8,095,602 B1 * | 1/2012 | Orbach ................ G06Q 10/107 709/206 |
| 8,676,903 B2 | 3/2014 | Bansal et al. |

(Continued)

*Primary Examiner* — Chris Parry
*Assistant Examiner* — Weiwei Stiltner
(74) *Attorney, Agent, or Firm* — David B. Woycechowsky; David H. Judson; Jeffrey S. LaBaw

(57) ABSTRACT

An email filter updating system includes a tracking component, and a logic component. The tracking component is provided to track user navigation. This tracking compiles information about websites the user has visited and presumably may "trust" in the event an email associated with one such site or application is later received by the user's email application. The logic component uses information and a set of configurable rule-based criteria to output a characterization that a particular email message has been initiated from a site that the user has visited or should otherwise trust. The characterization is then provided to the email filter to control whether in-bound email is passed to the user's email client inbox. Further, the logic component is operative to generate filter update commands that update the email filter in an automated manner, i.e., without user input.

13 Claims, 3 Drawing Sheets

(56) References Cited

U.S. PATENT DOCUMENTS

| | | | |
|---|---|---|---|
| 2005/0144279 A1* | 6/2005 | Wexelblat | G06Q 30/06 709/225 |
| 2007/0294351 A1* | 12/2007 | El-Emam | G06Q 10/107 709/206 |
| 2009/0204677 A1 | 8/2009 | Michaelis et al. | |
| 2010/0017360 A1* | 1/2010 | Bansal | H04L 51/12 707/E17.044 |
| 2010/0017476 A1* | 1/2010 | Shue | G06F 15/16 709/206 |
| 2011/0219081 A1* | 9/2011 | Parthasarathy | H04L 51/12 709/206 |
| 2012/0143962 A1 | 6/2012 | Bank et al. | |
| 2012/0303439 A1 | 11/2012 | Flitcroft et al. | |
| 2013/0117396 A1 | 5/2013 | Shuster et al. | |
| 2014/0052791 A1 | 2/2014 | Chakra et al. | |

\* cited by examiner

AUTOMATED SPAM FILTER UPDATING BY TRACKING USER NAVIGATION

BACKGROUND OF THE INVENTION

Technical Field

This disclosure relates generally to email processing and, in particular, to techniques to update an unwanted email message (or "spam") filter, e.g., based on tracking various forms of information collecting during user navigation.

Background of the Related Art

The use of email messages is commonplace for home and business. Email messages are used by individuals to keep in touch with and communicate with other users. Additionally, email messages provide a medium to collaborate and exchange documents. Unsolicited email messages are often received by users in their inboxes. These types of messages are also referred to as junk email, or unsolicited bulk email (or, more commonly, "spam"). The amount of undesired email messages sent to users has grown over time. With the amount of undesired email messages present, users often have to wade through numerous email messages to find the ones that they wish to read. While not a security risk per se, spam is one of the most common nuisances on the Internet. Spam is a broad term for e-mail messages of a commercial nature which are sent to a large number of users who had not requested the messages. Spam is disadvantageous because it consumes a significant quantity of computing resources. Spam must also frequently be manually deleted, which costs people a significant amount of time.

Many users of email use blacklists and whitelists included within their email software to control undesired spam, or junk, email from undesired email sources. A blacklist is a list of email addresses or domain names from which email is blocked. A whitelist is a list of email addresses or domain names from which email is allowed.

Typically, an email user's email software may provide a feature whereby if an email is received from an email address/domain name, a button or a link can be manually selected by a user to have the email address of the received email added to either a blacklist or a whitelist, that is to block or to allow email from that address in the future. In other cases, programs exist to mass-manage a large number of email and domain addresses and automatically blacklist or whitelist them. In either case, a user must still examine the email address and domain name of the received email to determine whether the email address/domain name should be whitelisted or blacklisted. There are also email programs that include a predefined, but regularly updated, list of email addresses/domain names that are known to be sources of spam email. When using such an email program, when a received email includes an address/domain name that matches an entry on the spam list, the received email is automatically blacklisted for the user by the email program.

However, there are times when a user is performing an online activity, such as making an online purchase on a website or registering for a blog, a newsletter or an online forum, such that the user desires and expects to receive emails from that site/domain. Unless the user adds the email address/domain name of that website manually to the whitelist of their email program or browser, emails from that source may end up being automatically tagged as spam, automatically added to their email blacklist, and unnecessarily blocked from being received in the future. Also, the user may not anticipate that an email address may be from a domain different from that of the actual website which was visited by the user, while still desiring to receive email from that other domain. This problem often occurs in the situation when a user registers to a site but then receives a confirmation email from some other domain that the user does not recognize; in response, the user may decide to register again and again until he or she gives up.

There remains a need to provide enhanced techniques for managing email that addresses these and related problems.

BRIEF SUMMARY

According to this disclosure, an email filter updating system includes a tracking component, a database, and a logic component. It is assumed that the email filter includes a whitelist, and a blacklist. The tracking component is provided to track user navigation (e.g., from a web browser or mobile app). This tracking compiles information about websites and web applications that the user has visited and presumably may "trust" in the event an email associated with one such site or application is later received by the user's email application. To that end, the information includes, for example, an existing browsing history, Internet protocol (IP) addresses visited by client applications, domain name system (DNS) domains and sub-domains visited, and cookie data (which typically includes data about visited sites). The information collected by the tracking component is maintained in the database. The logic component uses information in the database and a set of configurable rule-based criteria to output a characterization (or other measure of confidence) that a particular email message received by an email component has been initiated from a site or application that the user has visited or should otherwise trust. The characterization is then provided to the email filter to control whether in-bound email is passed to the user's email client inbox (and to update the email filter lists accordingly).

Further, the logic component is operative to generate one or more email filter update commands that update the email filter in an automated manner, i.e., without user input. Thus, for example, and based on the user's navigation as determined by the tracking component, the logic component may generate an update command to cause an entry in an email filter blacklist (i.e., an entry that was previously considered to be spam) to be moved to the whitelist. In this manner, in effect the system is trained to un-spam (or "de-spam") a message dynamically and in an automated fashion as the system builds confidence that a particular source (or initiator) of an in-bound email is or can be trusted.

The rule-based criteria by which the logic component is configured (and by which the system determines that an email is from a site or application that the user knows, trusts or uses) may be based on multiple parameters, such as time (e.g., a time period as measured from when the user initiated a registration action, a particular time-of-day, etc.), recency of a user visit, whether the email results from some other defined user-initiated activity (e.g., a registration), a frequency of user visits, website categorization information (e.g., known newspaper or social networking sites), any prior update to a filter list characterization (i.e., a domain being un-spammed), or any other information or mechanism determining that the initiator of a particular email is a trusted site. In addition, preferably the information in the database may be shared with server-side email filter mechanisms (or other such blocking devices) if filtering occurs externally to the email client.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
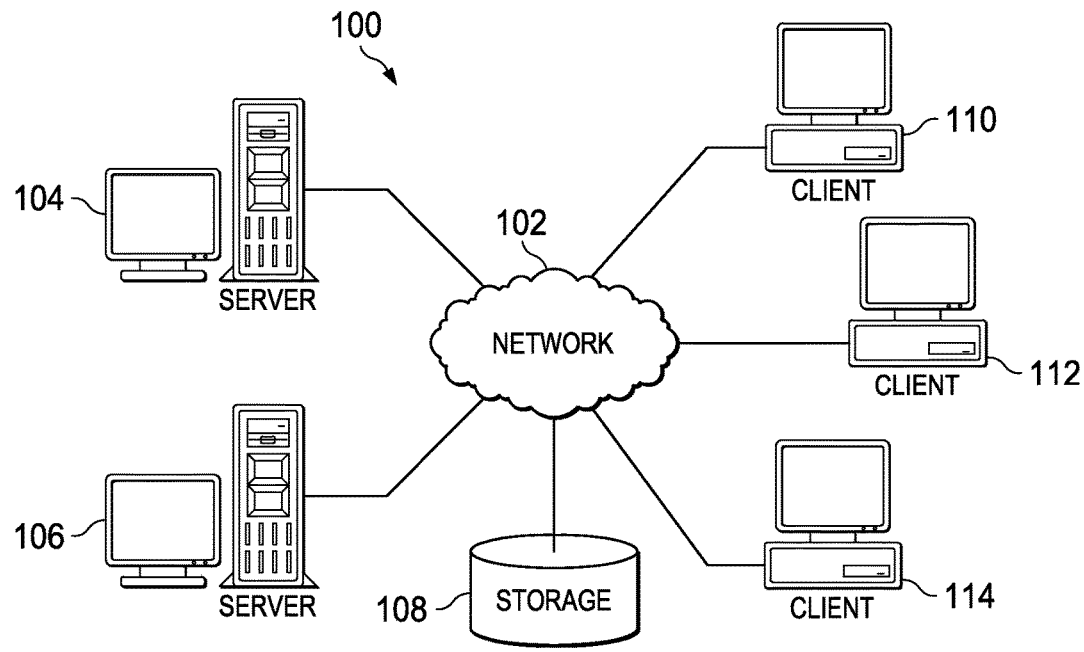
FIG. 1 depicts an exemplary block diagram of a distributed data processing environment in which exemplary aspects of the illustrative embodiments may be implemented.
Figure 2:
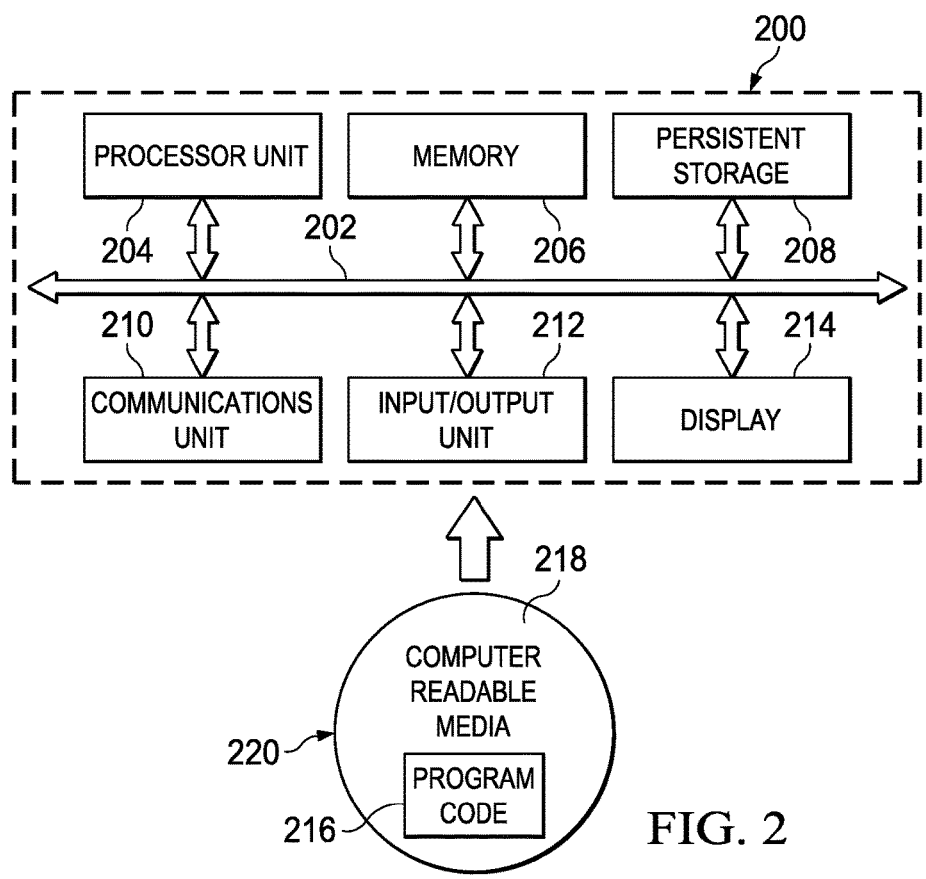
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
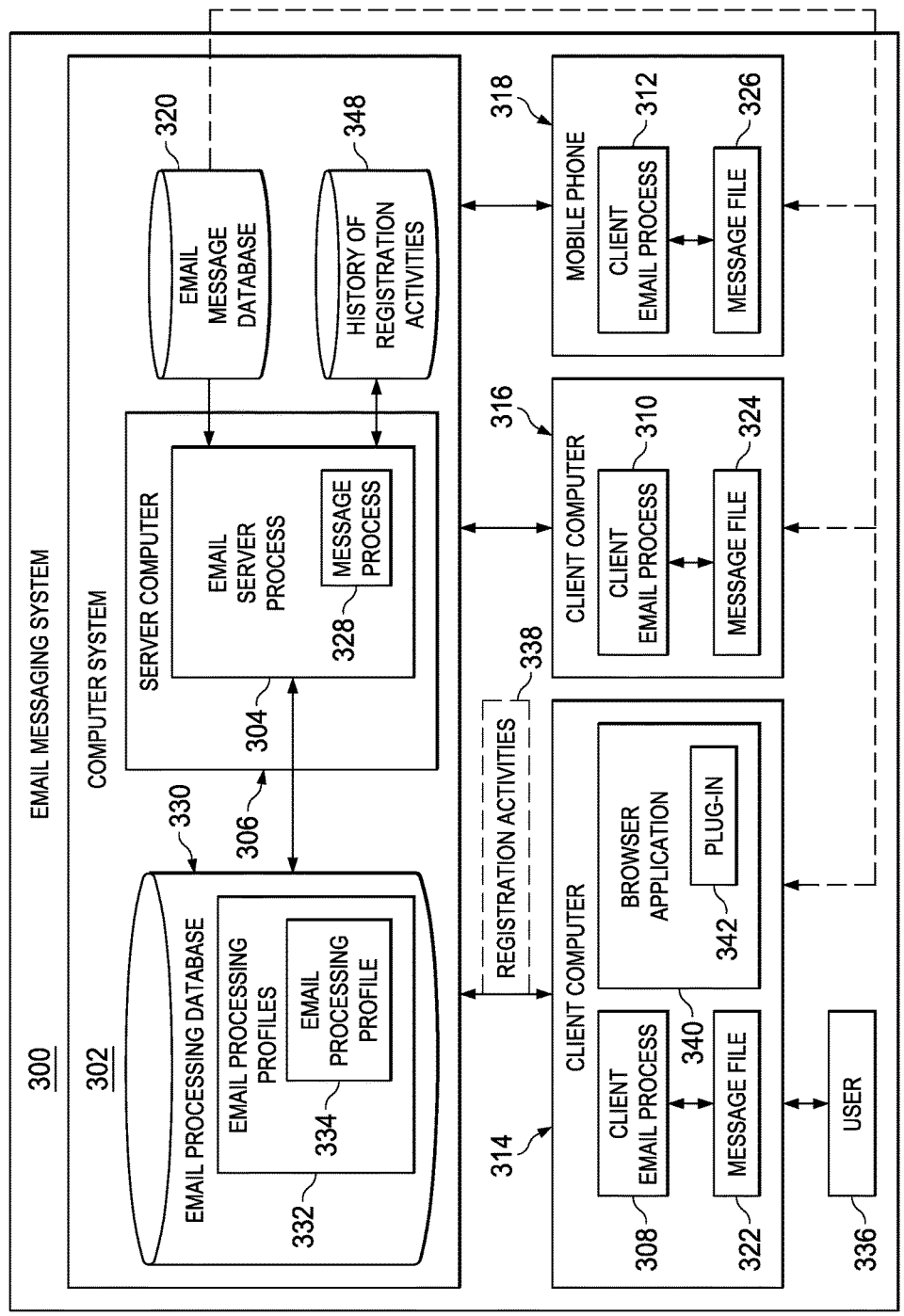
FIG. 3 illustrates a known email client-server application operative in associated with a client computing machine.

With reference now to FIG. 3, a diagram illustrating an email messaging system is depicted in accordance with an illustrative embodiment. Email messaging system 300 is an example of a messaging system that may be implemented in network data processing system 100 in FIG. 1. As depicted, email messaging system 300 includes computer system 302. Email server process 304 runs on computer system 302. Server computer 306 may be, for example, server computer 104 in FIG. 1 implemented using data processing system 200 in FIG. 2. In this illustrative example, email messaging system 300 includes email server process 304, which runs on server computer 306. Email server process 304 facilitates the exchange of messages between client email processes, such as client email process 308, client email process 310, and client email process 312. In these illustrative examples, client email process 308 runs on client computer 314, client email process 310 runs on client computer 316, and client email process 312 runs on mobile phone 318. Although three client email processes are illustrated, other numbers of client email processes may be present within email messaging system 300. Further, other devices may be present in addition to and/or in place of client computers and mobile phones. For example, without limitation, a laptop computer, a tablet, a personal computer, and other suitable types of data processing systems may be present within email messaging system 300.

In these illustrative examples, email server process 304 stores email messages for the different client email processes in email message database 320. The client email processes may store messages locally. For example, client email process 308 may store email messages in message file 322, client email process 310 may store email messages in message file 324, and client email process 312 may store email messages in message file 326. These message files store email messages received by the clients and may be organized into various mailboxes. Examples of various mailboxes include an inbox folder, a sent folder, a deleted folder, a "junk" (or "spam") folder, and an outbox folder. These client email processes may employ different protocols, depending upon the implementation. For example, simple mail transfer protocol (SMTP) is a standard email protocol that is based on TCP/IP. This protocol defines a message format and the message transfer agent which stores and forwards the mail. Other protocols, such as post office protocol 3 (POP3), also may be employed. As is well-known, when a client email process connects to email server process 304, any messages stored for that particular client email process in email message database 320 are sent to that client email process. Additionally, the client email process contacting email server process 304 may also send email messages to email server process 304 for distribution to other client email processes. In some cases, the email messages may be stored on email message database 320 without downloading the email messages. With this type of email system, client email processes may be web-based ones in which email is accessed using a web browser or other mobile-based application.

In this illustrative example, email server process 304 includes message process 328. Message process 328 processes email messages directed from senders to determine whether the email messages should be delivered to the receiver's inbox. In these illustrative examples, message process 328 accesses email processing database 330. In these illustrative examples, email processing database 330 contains email processing profiles 332. Email processing profiles 332 are associated with users who may be recipients of email messages. For example, email processing profile 334 may be associated with user 336 at client computer 316. Email processing profiles 332 include rules for determining whether email messages are to be delivered to the inbox of a user. For example, email processing profile 334 may be an email filtering profile that includes any number of email filters for filtering for desired emails.

In these illustrative examples, user 336 interacts with browser application 340 and performs registration activities 338. Browser application 340 is configured to access information on a network. For example, network browser application 340 may retrieve and present information from resources on the Web. Browser application 340 may be used to access information on networks that may not be located on the Web. Further, in some illustrative examples, browser application 340 may be used to save information to file systems. Examples of browser applications include Mozilla, Firefox, Internet Explorer, Google Chrome, and other suitable types of applications. In these examples, registration activities 338 performed by user 336 is detected by plug-in 342 for browser application 340. A plug-in is a set of software components configured to add capabilities or functions to a software application.

Registration activities 338 comprise any activities in which user 336 provides information indicating that user 336 desires to become associated with a particular entity. In these depicted examples, the entity is a website or web application (collectively "websites"). In the depicted examples, registration activities 338 are ones in which user 336 desires a relationship with the entity. This relationship may be a continuing relationship in which user 336 may receive information from the entity for some period of time. In some cases, the continuing relationship may last until user 336 performs an action to discontinue the relationship. In other cases, the continuing relationship may end after an event. This event may be, for example, the end of a subscription, delivery of goods or services, or some other suitable event. In the illustrative examples, registration activities 338 indicate that user 336 desires to have a relationship with the entity. Thus, the illustrative examples use registration activities 338 to identify entities from which user 336 desires to receive email messages. These types of activities are in contrast to those in which user 336 performs that result merely in the addition of universal resource locators to a browser history. Typically, visits to a website and selecting links to see different pages in a website are not registration activities, although websites may provide "cookies" or the like to the requesting client. User 336 may become associated by performing activities to obtain a membership with an entity or obtain a subscription for services or information from the entity. For example, registration activities 338 include any activities in which user 336 provides information to register with an entity to receive information from the entity.

Registration activities 338 may take a number of different forms. For example, a registration activity may include user 336 entering an email address into a form at a website. The entry of an email address may be to register for information from a website. The entry of an email address also may be performed to register with the website to receive information about a purchase that user 336 makes. In addition to email addresses, registration activities 338 also may include information identifying the type of interaction desired with the entity. Registration activities 338 also may include, for example, without limitation, topics of interest to user 336. Further, topics of interest may include certain keywords or key phrases in the body of an email and/or the subject of an email. Registration activities 338 identified by plug-in 342 are sent to message process 328 in email server process 304 on server computer 306. Registration activities 338 are added to history of registration activities 348 for user 336. Message process 328 uses history of registration activities 348 and may be used to create email processing profile 334. Registration activities 338 also may be used to update email processing profile 334. History of registration activities 348 is used by message process 328 to generate email processing profile 334, update email processing profile 334, or perform a combination of the two. In this manner, message process 328 may more accurately identify email messages that a user desires to read.

In these illustrative examples, message process 328 using email processing profiles 332 provides a white list for desired email messages. In other words, information in email processing profiles 332 is used to identify contacts or sources from which users desire to receive email messages. If an email message is not identified as a desired message that the user wants to receive, other processes used to identify undesired email messages may then be employed to determine whether to deliver the email message to the user's inbox. These processes may be included in message process 328 or other processes for email server process 304.

The illustration of email messaging system 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, message process 328 may be located at a client data processing system instead of on a server data processing system. In one illustrative example, message process 328 may be implemented in client email process 310. Email processing profile 334 for user 336 may still be located on server computer 306. In yet other illustrative examples, email processing profile 334 may be located locally at client computer 314.

The email system such as described above may be implemented in known commercial products and systems such as IBM® Notes®, Microsoft® Outlook®, Google® web-based Gmail®, and many others.

Automated Spam Filter Updating by Tracking User Navigation

Figure 4:
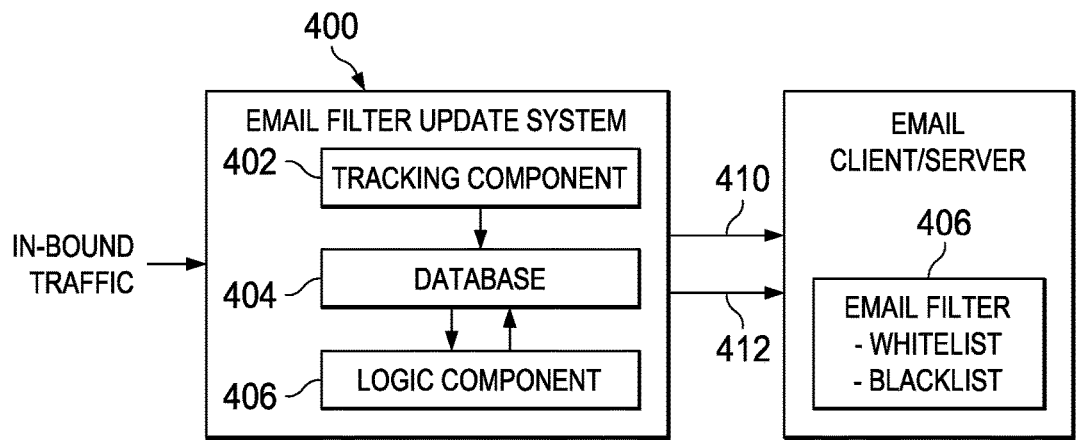
FIG. 4 is a simplified block diagram of the email filter update system according to an first embodiment of this disclosure wherein the system operates in a local (client-side) operating environment.

According to this disclosure, and with reference now to FIG. 4, an email filter updating system 400 preferably includes a tracking component 402, a database 404, and a logic component 406. The tracking and logic components of the filter updating system 400 of this disclosure typically are implemented in software, namely, computer program instructions executable by a hardware process. These components, together with the database, may be part of (integral with) an email client (e.g., such as client email process 308, 310 or 312 in FIG. 3), or the components may be implemented as a plug-in or other code distinct from the email client. The tracking and logic components may be distinct or integrated with one another. In one embodiment, the components are implemented as a plug-in 342 to a browser application, although this is not a requirement. Implementation as a browser plug-in is advantageous because, as will be described in more detail below, the tracking component 402 preferably operates to track a user's browsing history. As also seen in FIG. 4, typically the system of this disclosure operates in association with an email filter 408, which typically includes both a whitelist (a list of email addresses or domain names from which email is allowed), and a blacklist (a list of email addresses or domain names from which email is blocked). In FIG. 3, the email filter is illustrated as the email processing profile 334. As described above, the email filter includes rules for determining whether email messages are to be delivered to the inbox of the user.

In operation, the tracking component 402 is provided to track user navigation, e.g., from a web browser or mobile app. This tracking compiles information about websites and web applications (collectively referred to as "external websites") that the user has visited and presumably may "trust" in the event an email associated with one such site or application is later received by the user's email application. To that end, the information includes, for example, an existing browsing history, Internet protocol (IP) addresses visited by client applications, domain name system (DNS) domains and sub-domains visited, and cookie data (which typically includes such data about visited sites). The sub-domain information may be particular useful for tracking purposes, because it is often the case that emails (from trusted sites) originate from site sub-domains. The information collected by the tracking component 402 is maintained in the database 404, which itself may be a standalone component or part of an existing client or email filter mechanism.

According to this disclosure, the logic component 406 uses information in the database and a set of one or more configurable "rule-based criteria" to output a characterization (or, more generally, an indication, or other measure) that a particular email message intended for the user's inbox has been initiated from a site or application that the user has visited or should otherwise trust. The characterization 410 is then provided to the email filter 408 to control whether in-bound email is passed to the user's email client inbox (and to update the email filter lists accordingly). As is known, the email filter includes a mechanism to match incoming email (and, in particular, the domains, sub-domains, or other such information) with the whitelist and/or blacklist information.

The "rule-based criteria" by which the logic component 406 is configured (and by which the system determines that an email is from a site or application that the user knows, trusts or uses) may be hard-coded by the system, or such information may be input by the user (or some other permitted entity, such as an administrator) via a configuration user interface. A preferred approach is to expose a web-based interface by which a user can specify/define the criteria in a simple language or syntax. Typically, the "rule-based criteria" may be based on one or more parameters, such as time (e.g., a time period as measured from when the user initiated a registration action, a particular time-of-day, etc.), recency of a user visit, whether the email results from some other defined user-initiated activity (e.g., a registration), a frequency of user visits, website categorization information (e.g., known newspaper or social networking sites), any prior update to a filter list characterization (i.e., a domain being un-spammed), or any other information (such as a URI-pattern match) or mechanism determining that the initiator of a particular email is a trusted site. Using a simple editor or configuration tool, the user or permitted person preferably specifies the one or more "rule-based criteria" that is then applied by the system as a spam policy. There may be multiple spam policies, and the system may provide one or more "templates" from which the user may choose, or the user may customize his or her spam policy or policies. The following are several sample "rules" that may be pre-configured and/or custom-configured using the interface: "Allow any message received from any [IP address, domain, sub-domain] accessed by user," "Allow any message received from any IP address accessed by user within the last [time period]," "Allow any message received from a site that the user has visited more than [number] over [a specified time period]," "Allow any message received from [specified domain]," "Allow any message received from a [domain that has been de-spammed] within the last [time period]," "Allow any message received from a domain that has placed a cookie in the user's browser," "Allow any message received in the last [time period] and that includes a URI string that includes [character string]," "Allow any message sent from a domain to which user has registered," and so forth. The particular syntax used in these examples is not meant to be limiting, and these examples are provided solely to illustrate how different rule-based criteria may be defined and applied by the logic component 406 against the information collected by the tracking component 402. Generalizing, the user (or some other permitted person or entity) may specify one or more rule-based criteria in this manner to create one or more rules. The rules may be implemented as simple or complex Boolean or other type expressions, and one or more attributes therein may be static, or dynamically-generated or evaluated. Expressions may include nested logic, time-based logic, attribute-based logic, or combinations thereof. The logic component applies the rules against the collected information to determine which of the rules are triggered by the collected information.

According to a further feature of this disclosure, preferably the logic component 406 is operative to generate an email filter update command 412 that updates the email filter in an automated manner, i.e., without user input, when a rule such as described has been triggered. Thus, for example, and based on the user's navigation as determined by the tracking component 402, the logic component 406 may generate an update command 412 to cause an entry in an email filter blacklist (i.e., an entry that was previously considered to be spam) to be transferred (moved) to the whitelist. Outputs 410 and 412 from the logic component may be combined. In this manner, in effect the system is trained to un-spam (or "de-spam") a message dynamically and in an automated fashion. As the system builds confidence that particular sources (or initiators) of in-bound email are or can be trusted, the whitelist and blacklist information is updated automatically and autonomously, thereby increasing the ease-of-use of the email system.

When email filtering is carried out on the server (or otherwise externally to the email client), the information in the database 404 typically is shared with server-side email filter mechanisms (or other such blocking devices). Generalizing, the approach herein may be implemented in or in association with a local (client-side) spam filter, or in or in association with a remove (server-side) spam filter. In the local case (e.g., a desktop client such as IBM® Notes®), the user's machine determines if email is spam. The user's machine has the full set of tracked websites, and the email headers typically contain enough information to match against. In the remote case, the email server (e.g., IBM iNotes®) is responsible for determining if email is spam. In this embodiment, the email server receives the replica of the database (the tracked website data) from the user's machines to match against incoming emails, or it can mark the emails as potential spam, and then the local client may provide additional processing to match against the tracked websites. As one of ordinary skill will appreciate, depending on the implementation, the tracking component may be client-side while the logic component is server-side. Or, both components may be located on the same (typically client-) side.

Figure 5:
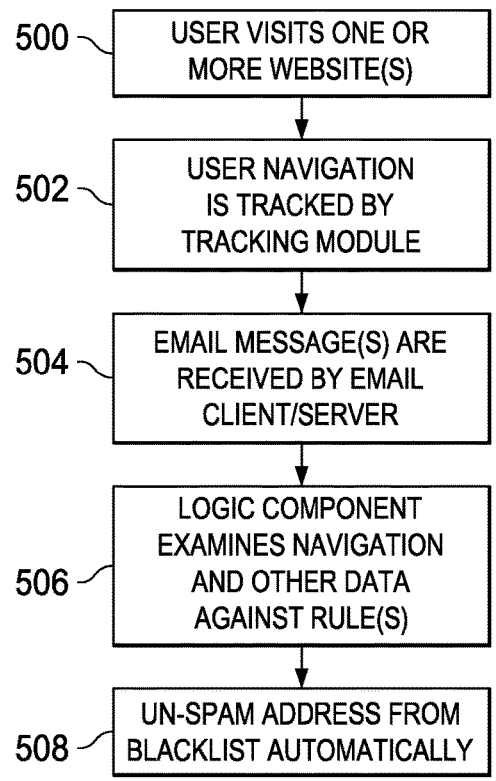
FIG. 5 is a simplified process flow diagram illustrating an email characterization and updating scheme according to this disclosure.

FIG. 5 illustrates a typical process flow for the technique of this disclosure. The routine assumes that the tracking and logic components are installed and running in association with the client computing machine, as has been described. At step 500 the user visits website and undertakes a given activity. At step 502, the tracking component adds information about the history of this browsing session to the database. Step 502 is repeated as the user visits other sites. The database may be updated continuously in this manner, perhaps on a first-in, first out (or least-recently-used) basis. The database or portions thereof may be periodically emptied (flushed). The information may be collected only for certain types of user activity, or for all activity. At step 504, one or more email messages are received for delivery to the user's inbox. These messages may be filtered on the client-side of the communication, or on the server-side, as described above. At step 506, the information from the database is examined against the one or more rule-based criteria that have been configured or otherwise specified. In particular, the system and the mail client exchange information (namely, the output of the logic component) to update the email client spam filter(s). Thus, typically, any domain identified by the logic component is added to the whitelist and the associated email (from which that domain originates) is placed in the user's inbox. From this point onward, non-spam mail from this website is placed in the user's inbox. At step 508, the logic component determines that a domain that it has approved for inclusion in the whitelist is already on the blacklist; accordingly, the logic component issues an additional update command, which as described above operates to cause the entry to be removed from the blacklist and transferred to the whitelist. The operations in step 508 are carried out automatically and autonomously, thereby continuously enhancing the accuracy of the email filter.

A representative but non-limiting use case is a scenario involving user navigation to a website that requires registration. It is assumed that the rule-based criteria are configured to include the following rules: "more than [threshold number] of accesses over the last [time period]" or "access within the last 24 hours." Based on the information collected by the tracking component, the logic component then determines whether one or more email messages should be passed to the user's inbox (whitelisted) or marked as spam (blacklisted). In particular, if the rule-based criteria are met, then the website from which the email originates is now considered as not specious (or is otherwise trusted); the email client will then be able to successfully receive the email (and future emails) from the site. On the other hand, if the rule-based criteria are not met, the website is considered specious (suspect), and the email is placed in the user's spam folder. As noted, when an email address (or other identifier) is passed by the logic component, that component may also evaluate whether the address is also present in the blacklist; if so, the entry in the blacklist is moved to the whitelist.

The subject matter described herein has many advantages. Using this technique, the user may use or custom-configure one or more spam filter(s) that are then enforced automatically and autonomously going forward. The result is that the user's inbox is assured to include appropriate emails, but excessive or coarse filtering (as done by the prior art) is avoided. The approach ensures that the user's email client does not block inappropriately email messages that the user expects and wants to receive, such as registration emails, notifications received from websites based on user preferences (e.g., Facebook® likes), service, password or account management emails, any service subscription that results in email notifications to the subscriber, marketing and newsletters received where the user signs-up for receipt, and the like.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The email filter update scheme described herein may be implemented in conjunction with various server-side architectures including simple n-tier architectures, web portals, federated systems, and the like. The techniques herein may be practiced in association with a loosely-coupled server (including a "cloud"-based) environment. As in the example scenario described, the email server-side (that may include the logic component) may be hosted in the cloud.

There is no limitation on the precise nature and type of user navigation information that is tracked, stored and used according to this disclosure.

The tracking and/or logic components according to this disclosure may be implemented in any computing entity that acts as a "client" to another server; thus, as described above, the techniques herein are not limited for use for strictly client-side web browser software but may also be implemented, for example, in a server or intermediary process that itself is acting as a client (to some other server component).

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the web application client state information reassignment functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the email filter update system components are implemented in a special purpose computer, preferably in software executed by one or more processors. The software is maintained in one or more data stores or memories associated with the one or more processors, and the software may be implemented as one or more computer programs.

As noted, the functionality need not be implemented in a conventional web browser; the approach may be implemented in a dedicated web app executing in a mobile client device, in a rich client, or the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

Having described the invention, what is now claimed is as follows:

1. A method to manage an email filter associated with a client computing machine, the method comprising:
    collecting information as a user navigates to and interacts with external websites;

applying one or more rule-based criteria to the collected information to determine a characterization to be applied to an initiator of an email message, the characterization being that the initiator is trusted;

providing the characterization to the email filter to facilitate an email filter operation with respect to a subsequent email message received from the initiator; and dynamically and in an automated manner as a given initiator is determined to be trusted, applying the rule-based criteria to the collected information and, in response, generating a filter update command that instructs the email filter to modify a preexisting email filter entry, to thereby improve an email system associated with the client computing machine;

wherein the collecting, applying and providing steps are carried out in software executing on a set of one or more computing devices.

2. The method as described in claim 1 wherein the information collected includes one of: the user's web browsing history, a list of IP addresses visited by one or more applications executing in the client computing machine, a list of DNS domains and sub-domains visited, and cookie data.

3. The method as described in claim 1 wherein the one or more rule-based criteria includes one of: time, recency, a user-initiated activity, a frequency of user visits, website categorization information, any prior update to a filter list characterization, and any other information to determine that the initiator of the email message is a trusted site.

4. The method as described in claim 1 further including providing a replica of the collected information to a server to facilitate server-side email filtering.

5. The method as described in claim 1 further including receiving data that defines the one or more rule-based criteria to be applied to the collected information.

6. The method as described in claim 1 wherein the rule-based criteria require that the email message be received from an IP address accessed by the user and within a given threshold time following an activity initiated by the user.

7. A method to manage an email filter associated with a client computing machine, the method comprising:

collecting information as a user navigates to and interacts with external websites;

applying one or more rule-based criteria to the collected information to determine a characterization to be applied to an initiator of an email message;

providing the characterization to the email filter to facilitate an email filter operation with respect to the email message; and providing at least one filter update command to instruct the email filter to automatically transfer at least one entry from a blacklist to a whitelist, the filter update command based on the characterization, to thereby improve an email system associated with the client computing machine;

wherein the collecting, applying and providing steps are carried out in software executing on a set of one or more computing devices.

8. The method as described in claim 7 wherein the information collected includes one of: the user's web browsing history, a list of IP addresses visited by one or more applications executing in the client computing machine, a list of DNS domains and sub-domains visited, and cookie data.

9. The method as described in claim 7 wherein the one or more rule-based criteria includes one of: time, recency, a user-initiated activity, a frequency of user visits, website categorization information, any prior update to a filter list characterization, and any other information to determine that the initiator of the email message is a trusted site.

10. The method as described in claim 7 further including providing a replica of the collected information to a server to facilitate server-side email filtering.

11. The method as described in claim 7 further including receiving data that defines the one or more rule-based criteria to be applied to the collected information.

12. The method as described in claim 7 wherein the rule-based criteria require that the email message be received from an IP address accessed by the user and within a given threshold time following an activity initiated by the user.

13. A method to manage an email filter associated with a client computing machine, the method comprising:

collecting information as a user navigates to and interacts with external websites;

applying one or more rule-based criteria to the collected information to determine a characterization to be applied to an initiator of an email message, the characterization being that the initiator is trusted;

providing the characterization to the email filter to facilitate an email filter operation with respect to a subsequent email message received from the initiator; and dynamically and in an automated manner as a given initiator is determined to be trusted, applying the rule-based criteria to the collected information and, in response, generating a filter update command that instructs the email filter to modify a given email filter entry, to thereby improve an email system associated with the client computing machine, wherein the filter update command instructs the email filter to automatically transfer the given email filter entry from a blacklist to a whitelist;

wherein the collecting, applying and providing steps are carried out in software executing on a set of one or more computing devices.

* * * * *